UNITED STATES PATENT OFFICE.

PHILANDER ROWLEY MYRES, OF OXFORD, OHIO.

IMPROVEMENT IN MEDICAL COMPOUNDS OR LINIMENTS.

Specification forming part of Letters Patent No. 124,910, dated March 26, 1872.

Specifications describing a certain compound called "The Great American Liniment," invented by PHILANDER ROWLEY MYRES, resident of Oxford, Ohio, to be used by external application for the cure of rheumatism, neuralgia, pains in the back or joints, sprains and bruises, in man or beast.

Two ounces oil wormwood; one ounce oil amber; one ounce oil cedar; one ounce oil hemlock; one-half ounce gum camphor; one ounce oil origanum; one ounce balsam-fur; one quart alcohol, ninety-eight per cent.

The nature of my invention consists in the combination of the specified ingredients to form a liniment that will penetrate the system and destroy the acidity of the blood, which medical science has demonstrated to be the cause of rheumatic and neuralgic pains.

To prepare "The Great American Liniment," mix the wormwood with the alcohol in a glass bottle or jar, and let it stand with occasional shaking for twenty-four hours; then add the other ingredients, when the mixture will assume a muddy appearance, which, by again occasionally shaking, will cause the floating particles to dissolve and disappear, leaving the liniment, in the course of twenty-four hours, a light clear color, ready for use.

To use this liniment for rheumatism or neuralgia, pour a small quantity on the surface of the affected parts and rub in with the palm of the hand in a quick and forcible manner, so as to produce irritation, and repeat this operation until one-half ounce or more of the liniment has penetrated through the skin, when it will find its channels into the blood in the muscles or joints where the disease is located. This application of the liniment and rubbing must be repeated every twelve hours until the pain ceases, which generally occurs in from twenty-four to seventy-two hours.

This liniment is used for lame back, sprains, or bruises, the same as it is used for rheumatism or neuralgia, curing all soreness in sprains or bruises in from two to twelve hours, and when applied immediately after the injury no soreness or pain—only weakness—will be experienced by the sufferer.

I claim—

This invention of a compound, composed of essential oils and other ingredients, substantially in the proportions and for the purposes set forth.

PHILANDER ROWLEY MYRES.

Witnesses:
S. R. MOLLYNEAUX,
Dr. JAMES M. SAUNDERS.